UNITED STATES PATENT OFFICE.

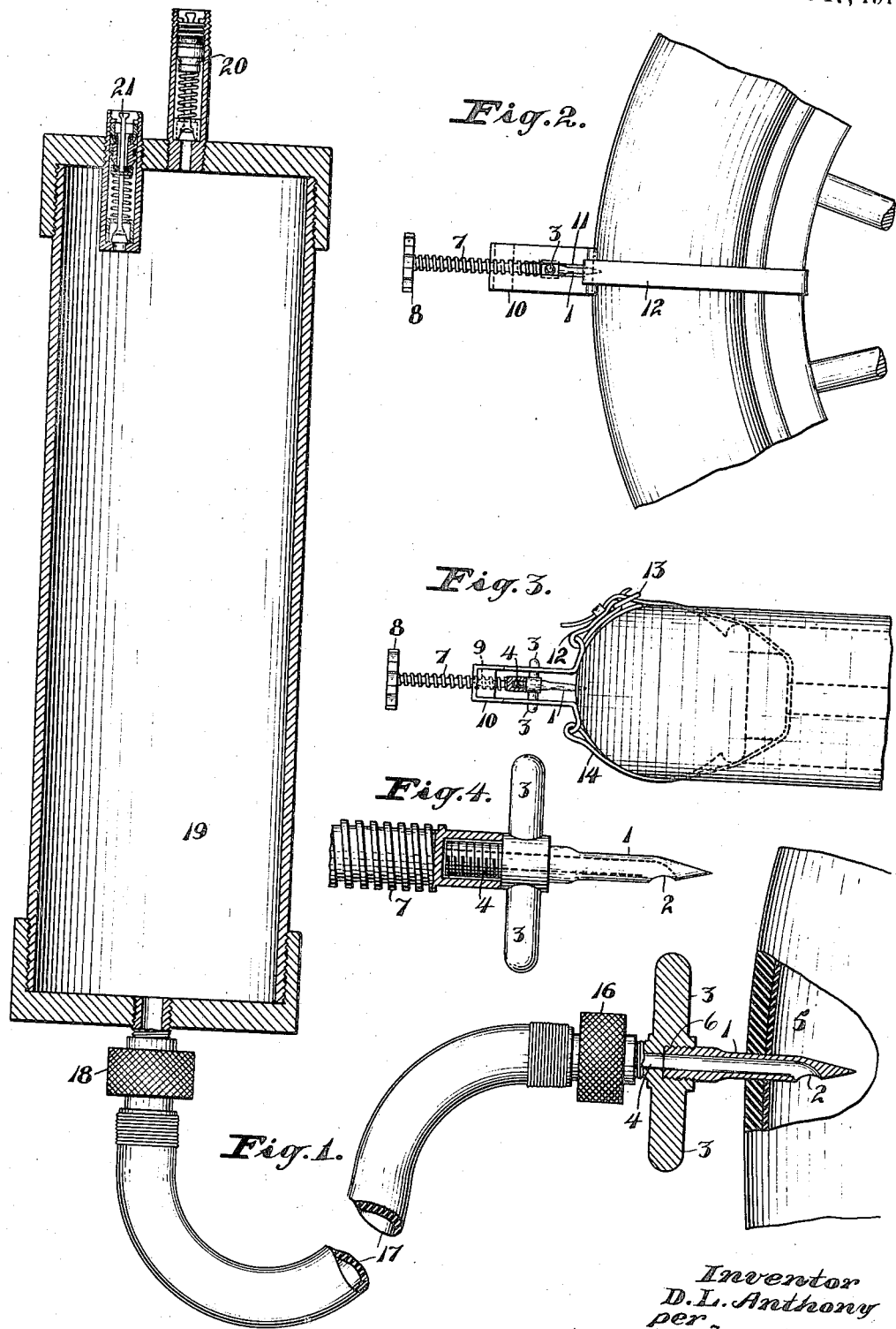

DANIEL L. ANTHONY, OF EL PASO, TEXAS.

METHOD OF AND MEANS FOR INFLATING AND INTRODUCING SEALING LIQUID INTO PNEUMATIC TIRES.

1,307,173.  Specification of Letters Patent.  Patented June 17, 1919.

Application filed October 11, 1916. Serial No. 124,972.

*To all whom it may concern:*

Be it known that I, DANIEL L. ANTHONY, a citizen of the United States, residing at El Paso, in the county of El Paso and State of Texas, have invented new and useful Improvements in Methods of and Means for Inflating and Introducing Sealing Liquid Into Pneumatic Tires, of which the following is a specification.

Heretofore considerably trouble and loss of time have been experienced in injecting into the interiors of pneumatic tires of automobiles, bicycles and the like, the sealing liquids, powders, or compounds which are in common use for automatically sealing punctures in said tires. The sealing liquid has been injected by being forced through the valve of the pneumatic tire, but this process required that the valve stem be removed from the valve in order to inject the liquid, and therefore was a very slow one, necessitating about three hours' time.

The object of the present invention is to provide a method and apparatus by which the sealing liquid, powder, or compound can be injected into a pneumatic tube in a very much less time and with less trouble than formerly.

In the accompanying drawing, Figure 1 is a broken longitudinal sectional view, certain parts being shown in side elevation, of a needle and barrel for injecting a sealing liquid; Fig. 2 is a broken side view of a pneumatic tire and of mechanism for inserting a needle thereinto; Fig. 3 is a plan view thereof; Fig. 4 is an enlarged broken side view of a needle and of a portion of a screw for inserting the needle, said screw being shown partly in section.

Referring to the drawing, 1 indicates a hollow needle, having an opening 2 through its side near its point. On the outer end 6 of the needle is screwed the inner threaded end of a hollow stem 4 threaded on its outer end having arms 3. To cause said needle 1 to puncture a pneumatic tire 5, the point of the needle is set on the outer tread of the tire, and around the stem 4 is placed a socketed portion of a screw 7; having at its outer end a handle 8, and screwed through a bearing 9 in the central portion of a yoke 10, the side members of which yoke are formed with longitudinal slots 11, through which extend and are guided the terminal portions of the arms 3, said yoke being attached around the pneumatic tire by a strap 12 attached to one of its sides and carrying a buckle 13, and a strap 14 attached to its other side, and the free end of which engages said buckle. After the point of the needle has been placed against the tread of the tire and the yoke has been so attached, the screw is screwed inwardly, causing the needle to penetrate the pneumatic tube. The escape of air through the needle indicates that the tube has been punctured.

If it is desired to penetrate a deflated tire, the yoke, holding the needle in place, is strapped on as before, and the tire is inflated by means of air passed through the regular tire valve. The inflation of the tire forces the tire against the point of the needle so that it is penetrated thereby.

The yoke and screw are then removed from the needle, and there is screwed on to said stem 4 an end of a metallic tubular union 16, the other end of which is attached to one end of a rubber tube 17, the other end of which is attached to a metallic tubular union 18, connected to an end of a barrel 19 containing the sealing liquid or compound. In the other end of the barrel is secured a valve 20, of the same construction as the ordinary valve for pneumatic tires, and this valve is attached to a source of supply of compressed air, not shown. The pressure of the air then forces the liquid from the barrel into the pneumatic tube. After all the liquid has been forced from the barrel into the pneumatic tube, the compressed air is admitted through the barrel into the pneumatic tube, by which the tire is inflated to the desired pressure.

After the tire is properly inflated, the needle is withdrawn and the sealing liquid or compound stops the hole made by the needle.

By the present device four tires can be loaded with sealing liquids in about twenty minutes.

Some of these liquids contain a great amount of fiber, which may clog up the opening. To prevent this result I provide a valve 21 through the same end of the barrel as that to which the valve 20 is attached, and of the same construction. If the needle becomes clogged it is only necessary to press inwardly the valve 21, the back pressure of the air having a tendency to clear the needle. If it does not do so, the air can all be let out of the barrel, the flexible tube detached from the needle, and a small wire having a threaded end can be inserted in the needle and given a slight turn, whereupon the thread on the wire will catch hold of, and pull out, the obstruction.

The valve 21 can also be used to partly deflate the tire, should it be inflated too much.

I claim:—

1. The method of inflating, and introducing sealing liquid into, a pneumatic tire, which consists in puncturing the pneumatic tire, and then, through the opening thus made, introducing in a single operation into the pneumatic tire, first, a tire sealing liquid, and, then, compressed air in quantity sufficient to fully inflate the tire.

2. In means for inflating, and introducing sealing liquid into, a pneumatic tire, a hollow needle sufficiently sharp to penetrate the tire and having an opening in its side, a vessel for containing the sealing liquid, a flexible tube one end of which is connected with said vessel, means whereby the other end can be connected with the passage through the hollow needle, and an inlet valve for admitting compressed air into said vessel.

3. In means for injecting a sealing liquid into a pneumatic tube, the combination of a hollow needle having an opening near its point, a hollow supporting member having arms and screwed on the outer end of the needle and having an externally threaded hollow stem remote from the needle, a flexible tube, one end of which communicates with said stem, a vessel one end of which is secured to the other end of said tube, and a bicycle tire valve in the other end of said vessel.

4. In means for injecting a sealing liquid into a pneumatic tube, the combination of a hollow needle having an opening near its point, a hollow supporting member having arms and screwed on the outer end of the needle and having an externally threaded hollow stem remote from the needle, a flexible tube, one end of which communicates with said stem, a vessel one end of which is secured to the other end of said tube, and two bicycle tire valves in the other end of said vessel.

5. In means for inserting an injection needle into a pneumatic tube, a hollow supporting device for the needle having a stem and outwardly extending arms, a screw support, means for securing said support in stationary relation to the tread of a pneumatic tire, and a screw screwed through said support, its inner end being recessed to receive the stem therein.

6. In means for inserting an injection needle into a pneumatic tube, a hollow supporting device for the needle having a stem and outwardly extending arms, a yoke, the sides of which are formed with guides for said arms, means for securing said yoke in contact with the tread of a pneumatic tire, and a screw screwed through the central part of said yoke, its inner end being recessed to receive the stem therein.

DANIEL L. ANTHONY.